US012608238B2

(12) United States Patent
Jin et al.

(10) Patent No.: US 12,608,238 B2
(45) Date of Patent: Apr. 21, 2026

(54) RESOURCE SCHEDULING METHOD, ELECTRONIC DEVICE, AND STORAGE MEDIUM

(71) Applicant: ZTE Corporation, Shenzhen (CN)

(72) Inventors: Shiying Jin, Shenzhen (CN); Zhenyu Wang, Shenzen (CN); Bingtao Han, Shenzhen (CN); Yaofeng Tu, Shenzhen (CN); Hong Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 722 days.

(21) Appl. No.: 18/014,125

(22) PCT Filed: Jul. 2, 2021

(86) PCT No.: PCT/CN2021/104248
§ 371 (c)(1),
(2) Date: Dec. 30, 2022

(87) PCT Pub. No.: WO2022/002247
PCT Pub. Date: Jan. 6, 2022

(65) Prior Publication Data
US 2023/0273833 A1 Aug. 31, 2023

(30) Foreign Application Priority Data
Jul. 3, 2020 (CN) .......................... 202010635990.1

(51) Int. Cl.
*G06F 9/50* (2006.01)
*G06F 9/48* (2006.01)
(52) U.S. Cl.
CPC .......... *G06F 9/5055* (2013.01); *G06F 9/4881* (2013.01)

(58) Field of Classification Search
CPC ................. G06F 9/5055; G06F 9/4881; G06F 2209/5019; G06F 9/505; G06F 9/544; G06F 9/546
See application file for complete search history.

(56) References Cited

U.S. PATENT DOCUMENTS

| 10,530,887 B1 * | 1/2020 | Mehr .................. H04L 67/5681 |
| 2018/0129524 A1 * | 5/2018 | Bryant ................ G06F 11/3006 |
| 2019/0340521 A1 | 11/2019 | Liu et al. |

FOREIGN PATENT DOCUMENTS

| CN | 105975340 A | 9/2016 |
| CN | 108701149 A | 10/2018 |

(Continued)

OTHER PUBLICATIONS

Extended European Search Report for European Application No. 21834695.5 dated Aug. 2, 2023.

(Continued)

*Primary Examiner* — Jorge A Chu Joy-Davila
(74) *Attorney, Agent, or Firm* — Wolf, Greenfield & Sacks, P.C.

(57) ABSTRACT

Disclosed are a resource scheduling method, an electronic device and a storage medium. The resource scheduling method may include: acquiring an intelligent application processing request acquiring current resource usage information; matching an intelligent application instance according to the intelligent application processing request and creating a task according to the resource usage information and the intelligent application instance, to process the intelligent application processing request.

15 Claims, 7 Drawing Sheets

(56)                     References Cited

FOREIGN PATENT DOCUMENTS

| CN | 109561024 A | 4/2019 |
| CN | 109960591 A | 7/2019 |
| CN | 110830759 A | 2/2020 |

OTHER PUBLICATIONS

Marahatta et al., Classification-based and energy-efficient dynamic task scheduling scheme for virtualized cloud data center. IEEE Transactions on Cloud Computing. May 23, 2019;9(4):1376-90.
International Search Report and Written Opinion for International Application No. PCT/CN2021/104248 mailed Sep. 6, 2021.
First Office Action and Search Report for Chinese Application No. 202010635990.1, dated Mar. 8, 2025.

* cited by examiner

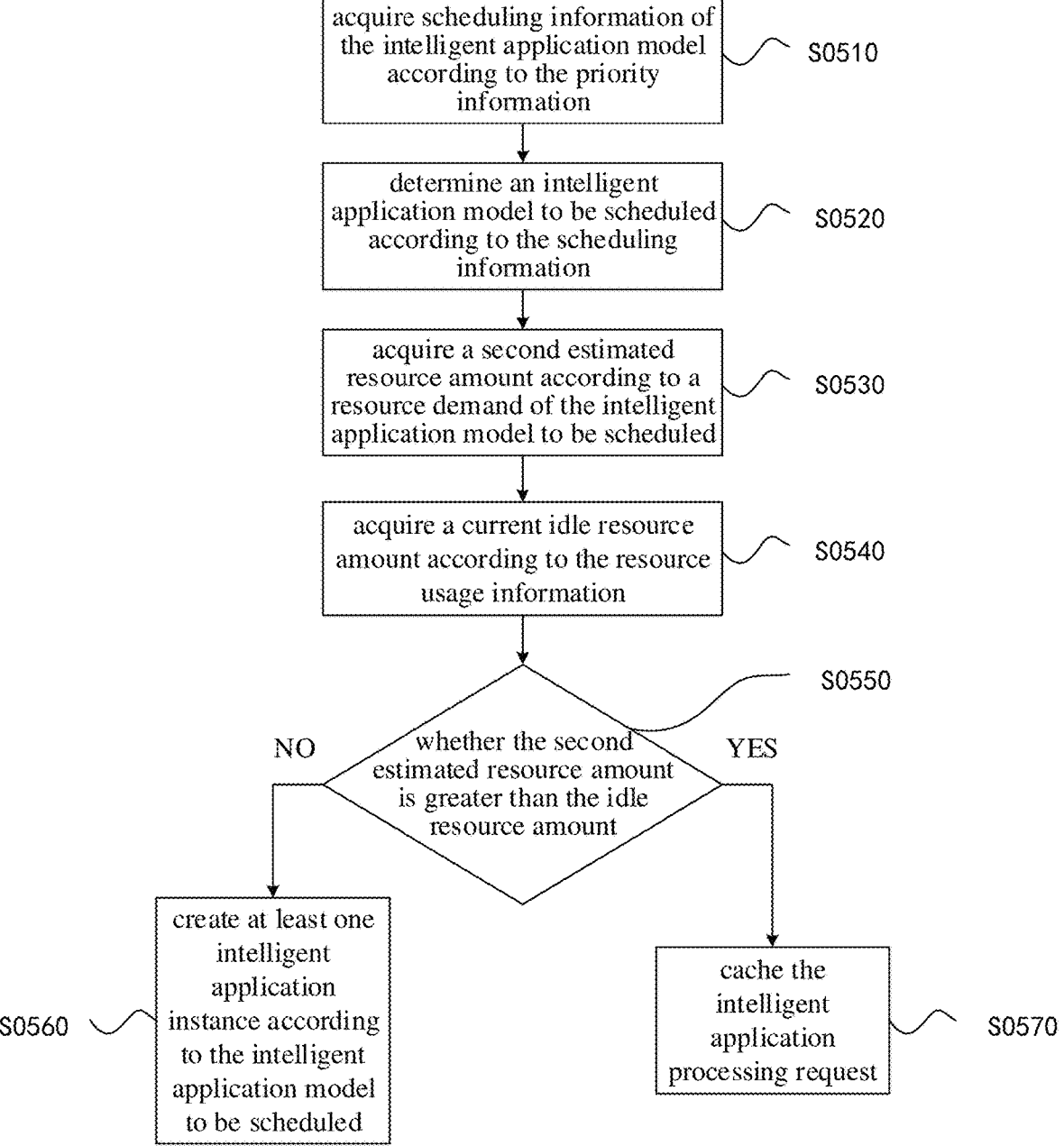

acquire scheduling information of the intelligent application model according to the priority information    S0510 determine an intelligent application model to be scheduled according to the scheduling information    S0520 acquire a second estimated resource amount according to a resource demand of the intelligent application model to be scheduled    S0530 acquire a current idle resource amount according to the resource usage information    S0540

S0550 whether the second estimated resource amount is greater than the idle resource amount

NO                    YES create at least one intelligent application instance according to the intelligent application model to be scheduled    S0560 cache the intelligent application processing request    S0570

Fig. 5 acquire a corresponding intelligent application model according to the intelligent application instance — S0810 acquire a number of to-be-processed requests corresponding to the intelligent application model in a cache queue — S0820 adjust an instance concurrency number of the intelligent application model according to the number of to-be-processed requests — S0830

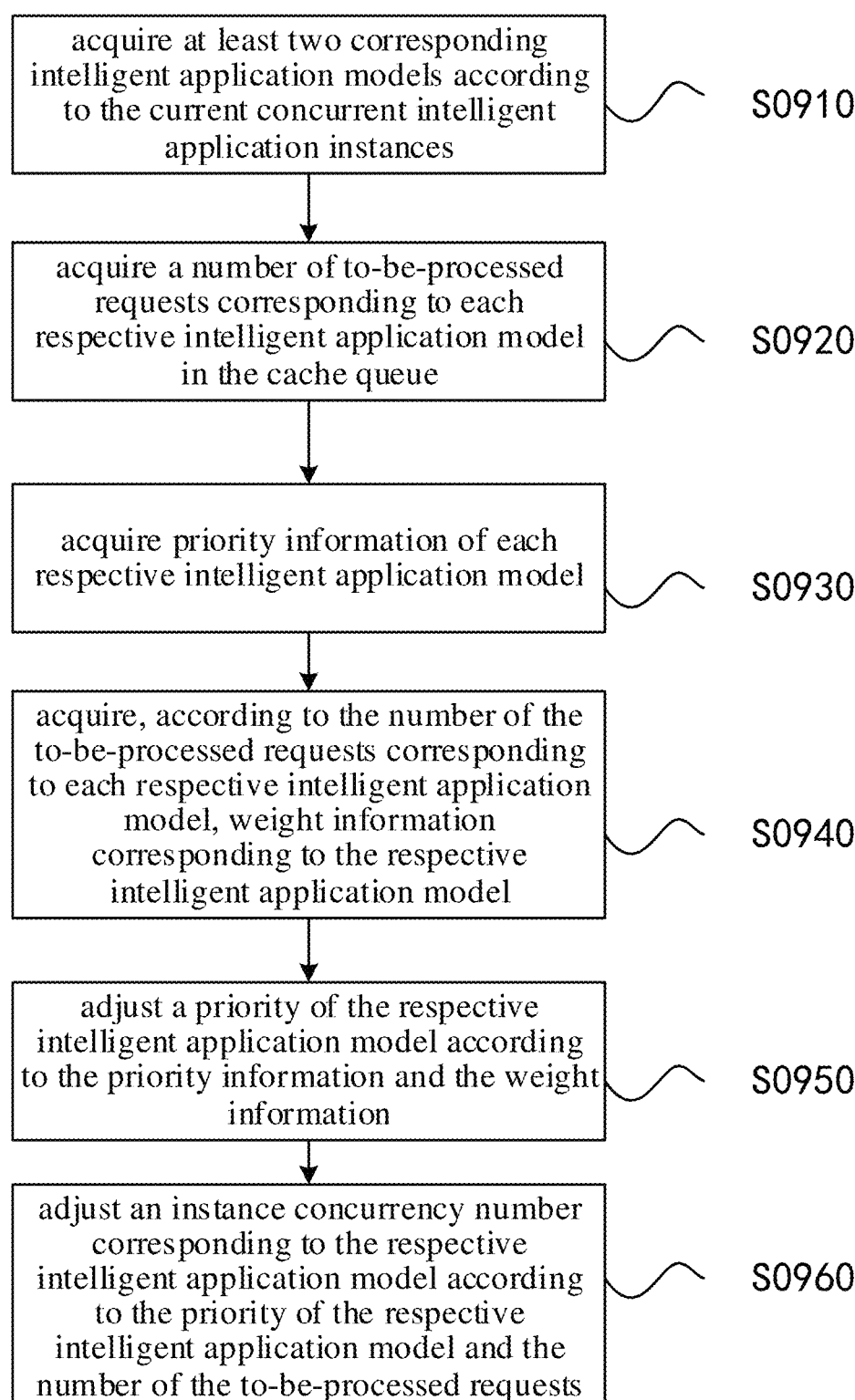

acquire at least two corresponding intelligent application models according to the current concurrent intelligent application instances — S0910 acquire a number of to-be-processed requests corresponding to each respective intelligent application model in the cache queue — S0920 acquire priority information of each respective intelligent application model — S0930 acquire, according to the number of the to-be-processed requests corresponding to each respective intelligent application model, weight information corresponding to the respective intelligent application model — S0940 adjust a priority of the respective intelligent application model according to the priority information and the weight information — S0950 adjust an instance concurrency number corresponding to the respective intelligent application model according to the priority of the respective intelligent application model and the number of the to-be-processed requests — S0960

Report

Adjustment

RESOURCE SCHEDULING METHOD, ELECTRONIC DEVICE, AND STORAGE MEDIUM

CROSS-REFERENCE TO RELATED APPLICATION

This application is a national stage filing under 35 U.S.C. § 371 of international application number PCT/CN2021/104248, filed Jul. 2, 2021, which claims priority to Chinese patent application No. 202010635990.1, filed Jul. 3, 2020. The contents of these applications are incorporated herein by reference in their entirety.

TECHNICAL FIELD

The present disclosure relates to the technical field of intelligent applications, and more particularly, to a resource scheduling method, an electronic device and a storage medium.

BACKGROUND

Intelligent application refers to the application of intelligent technology and management which focuses on artificial intelligence application and is led by intelligent big data. An intelligent application model database is created, and frequently-used intelligent application models are stored in the database, so that corresponding intelligent application models in the database are directly invoked in different intelligent application scenarios (for example, intelligent home, intelligent transportation, intelligent education, intelligent retail, etc.) without repeating the process of creating intelligent application models, thereby speeding up the deployment of intelligent applications, which is of great significance to the deployment and promotion of intelligent applications.

However, certain system resources (for example, CPU cores, GPU, memory, chip resources, etc.) are occupied when invoking intelligent application models, and known intelligent application models are deployed on a device with limited system resources. Due to the limited system resources of the device, it is easy to cause problems such as poor deployment flexibility of intelligent application models, low overall operating efficiency of the device, affected operation of existing functional modules of the device, and the like.

SUMMARY

Embodiments of the present disclosure provide a resource scheduling method, an electronic device and a storage medium.

In accordance with an aspect of the present invention, an embodiment provides a resource scheduling method. The method may include: acquiring an intelligent application processing request; acquiring current resource usage information; matching an intelligent application instance according to the intelligent application processing request; and creating a task according to the resource usage information and the intelligent application instance, to process the intelligent application processing request.

In accordance with another aspect of the present disclosure, an embodiment provides an electronic device. The electronic device may include a memory, a processor, and a program stored in the memory and executable by the processor which, when executed by the processor, causes the processor to carry out the resource scheduling method described above.

In accordance with another aspect of the present disclosure, an embodiment provides a storage medium configured for computer readable storage, where the storage medium stores at least one program which, when executed by at least one processor, causes the at least one processor to carry out the resource scheduling method described above.

Other features and advantages of the present disclosure will be set forth in the following description, and partly become obvious from the description, or understood by implementing the present disclosure. The objects and other advantages of the present disclosure can be realized and obtained by the structure particularly pointed out in the description, claims, and drawings.

BRIEF DESCRIPTION OF DRAWINGS

FIG. 5 is a flowchart of an embodiment of S0330 in FIG. 3;

FIG. 9 is a flowchart of another embodiment prior to S0140 in FIG. 1;

DETAILED DESCRIPTION

Figure 1:
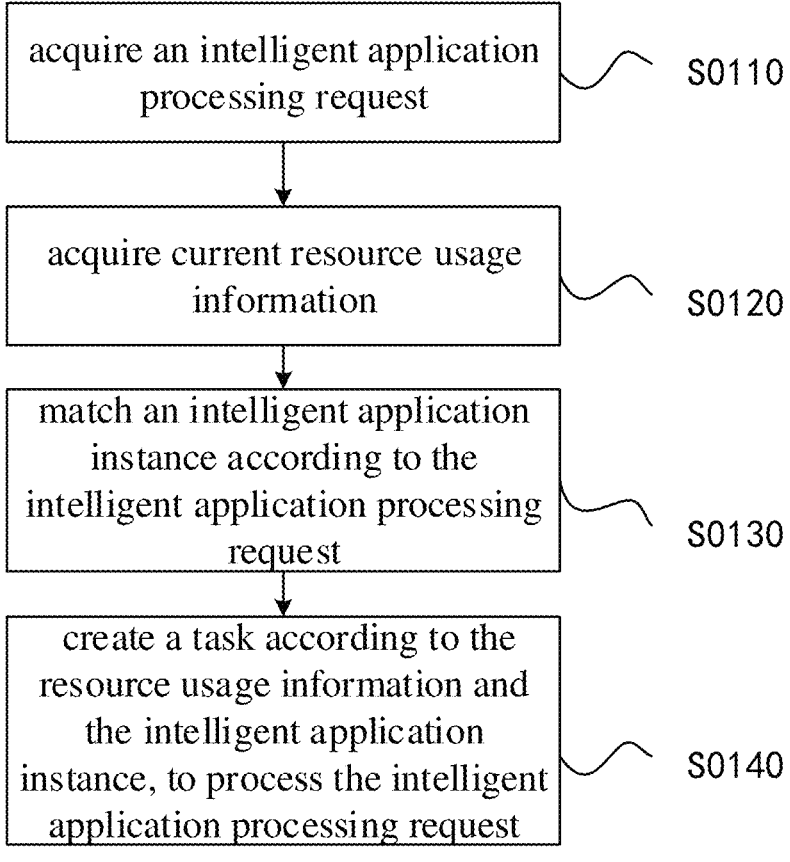
FIG. 1 is a flowchart of resource scheduling provided by an embodiment of the present disclosure.

In order to make the objects, technical schemes and advantages of the present disclosure clear, the present disclosure will be further described in detail with reference to the drawings and embodiments. It should be understood that the specific embodiments described here are only used to illustrate the present disclosure, and are not intended to limit the present disclosure. The embodiments in the present disclosure and the features in the embodiments may be arbitrarily combined with each other if not in collision.

It is to be noted, although logical orders have been shown in the flowcharts, in some cases, the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

In the embodiments of the present disclosure, the intelligent application models include a face/fingerprint recognition model, an image/file classification model, a network traffic/data traffic/telephone traffic control model, and the like. For example, if an intelligent application processing request is an application demand for face recognition, a corresponding face recognition model is queried in a model database or an instance corresponding to the face recognition model is directly queried according to the application demand for face recognition, and idle computing resources of a system may be utilized to run the face recognition instance to create a face recognition task, and thus face recognition is performed through the face recognition task.

As the application scenarios of artificial intelligence and deep learning in all walks of life become more and more extensive, intelligent application can complete more and more types of tasks, usually involving multiple services of multiple models (solving problems of different algorithms for different scenarios).

In some cases, intelligent application models are generally deployed on a device (such as a server) with "unlimited" (dynamically extendible) system resources. This method has the problems of high latency, poor flexibility, difficult management of intelligent application services, high data security risk, and the like. For example, for a CS architecture composed of a server and a base station, a common method to deploy intelligent applications is to use system resources on an existing server (such as the server) in a core network to add one or more intelligent application services for specific models onto the server, while an edge device such as the base station sends requests such as reasoning (prediction) and the like through a network interface, and the server processes the requests and return a result. This method has the following disadvantages:

1) High latency: there is certain communication overhead from the base station to the server. For some scenarios having high requirements for inference latency or large data volume, the effect is not satisfactory.

2) Poor flexibility: all models are deployed on the server, which leads to insufficient flexibility. For example, on some base stations, there may be demands to flexibly adjust the deployment method and operation situation of the models according to actual situations (such as adjust the number of concurrent requests supported by the models). In this scheme, flexible adjustment cannot be made, that is, personalization cannot be achieved.

3) Difficult management of intelligent application services: as a real data generation "source", the base station is responsible for generating training and inference requests. However, the requests generated are not single in type, and usually involve multiple services of multiple models (solving problems of different algorithms for algorithms scenarios). This method brings certain design difficulty and complexity to the base station, as well as some inconvenience in management.

4) High data security risk: more importantly, under the current situation where data privacy is more important, if the base station and the server belong to different service providers, there is a risk of user data exposure.

In a device with limited system resources, due to the limited system resources of the device, it is easy to cause problems such as poor deployment flexibility of intelligent application models, low overall operating efficiency of the device, affected operation of the existing functional modules of the device, and the like. For example, for a CS architecture composed of a server and a base station, the method to deploy intelligent application models in the base station (the device with limited resource) has the following problems:

1) Poor deployment flexibility: although there are "idle" resources on the base station and other devices, there is also an upper limit. If individual models are separately deployed, subsequent tasks will inevitably be affected when running, and there will be a serious "queuing" phenomenon in the tasks.

2) Low overall operating efficiency of base station: the models on the server have no influence on each other, and can be scheduled independently. However, on the base station, because of the limited resources, there is a problem of resource preemption when models are scheduled independently, such that models frequently needed can't perform tasks in time, while models unfrequently needed keep preempting the resources, resulting in low overall operating efficiency of the system.

3) Affecting operation of existing functional modules of base station: the base station itself provides many functions, and have many functional modules resided thereon. If an intelligent system is not properly deployed, the operation of the existing functional modules may be affected in extreme cases, which may bring hidden dangers.

In view of the above, according to the resource scheduling method, electronic device and storage medium provided by the embodiments of the present disclosure, system resources can be adaptively scheduled, and system idle resources can be utilized to invoke intelligent application models, such that the resource utilization rate is improved, thereby effectively improving the flexibility of intelligent application model deployment and the overall operating efficiency of the device, without affecting the operation of the existing functional modules of the device.

In accordance with an aspect of the present disclosure, an embodiment provides a resource scheduling method. Referring to FIG. 1, the method includes following steps S0110 to S0140:

At S0110, an intelligent application processing request is acquired.

At S0120, current resource usage information is acquired.

At S0130, an intelligent application instance is matched according to the intelligent application processing request.

At S0140, a task is created according to the resource usage information and the intelligent application instance, to process the intelligent application processing request.

In some embodiments, one task is configured to process one intelligent application processing request, and one intelligent application instance is configured to process only one task at a certain time. One intelligent application processing request is acquired, one corresponding intelligent application instance is matched for the intelligent application processing request, and a resource demand of the intelligent application instance and current resource usage information are acquired. If there are idle resources currently and an idle resource amount is not less than an estimated resource amount of the intelligent application instance, one task is created by means of the intelligent application model, and the task is used to process the intelligent application processing request. The resource usage information includes information about resources that the system is using and current idle resource information. A resource demand of one intelligent application instance is a resource amount required to run the intelligent application instance, that is, an estimated resource amount of the intelligent application instance. If the estimated resource amount is unknown, the resource amount actually occupied by the intelligent application instance is recorded when the intelligent application instance is run, and take the resource amount as the estimated resource amount which may be the actual resource amount recorded when the intelligent application instance is run once, or may be an average resource amount, a lowest resource amount or a highest resource amount calculated according to an actual resource amount recorded each time when the intelligent application instance is run many times.

Figure 2:
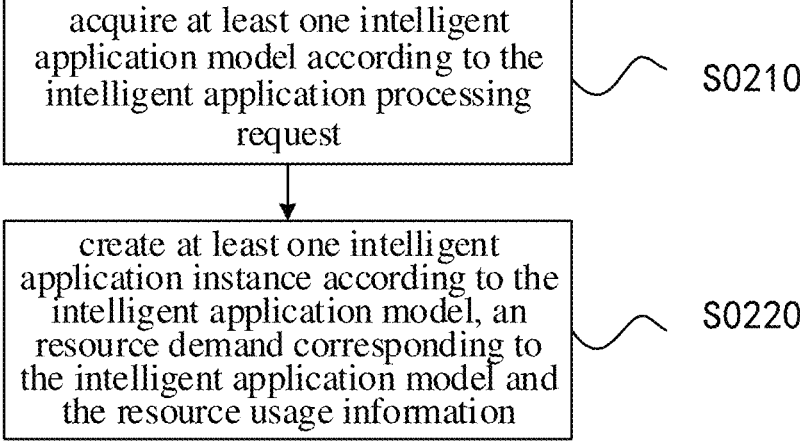
FIG. 2 is a flowchart of an embodiment prior to S0130 in FIG. 1.

In some embodiments, referring to FIGS. 1 and 2, prior to S0130, the method further includes following steps of S0210 to S0220.

At S0210, at least one intelligent application model is acquired according to the intelligent application processing request.

At S0220, at least one intelligent application instance is created according to the intelligent application model, a resource demand corresponding to the intelligent application model, and the resource usage information.

One intelligent application processing request is acquired, and one corresponding intelligent application instance is matched for the intelligent application processing request. If there is no corresponding intelligent application instance currently, one intelligent application instance is required to be created. To create one intelligent application instance, one intelligent application model is acquired, and then one corresponding intelligent application model is matched for the intelligent application processing request by traversing a model database, and a resource demand of the intelligent application model and current resource usage information are acquired. If there are idle resources currently and the amount of the idle resources is not less than an estimated resource amount of the intelligent application model, one intelligent application instance is created by means of the intelligent application model, and the intelligent application instance is configured to create one task. The resource usage information includes information about resources that the system is using and current idle resource information. A resource demand of one intelligent application model is the resource amount required to run the intelligent application model, that is, an estimated resource amount of the intelligent application model. If the estimated resource amount is unknown, the resource amount actually occupied by the intelligent application model is recorded when the intelligent application model is run, and take the resource amount as the estimated resource amount which may be the actual resource amount recorded when the intelligent application model is run once, or may be an average resource amount, a lowest resource amount or a highest resource amount calculated according to the actual resource amount recorded each time when the intelligent application model is run many times. In some embodiments, by traversing the model database once according to the intelligent application processing request, at least one corresponding intelligent application model can be found, and each intelligent application model is used to create a corresponding intelligent application instance. If there is a demand for concurrently processing tasks, additional intelligent application instances are created. By traversing the model database for a second time, the intelligent application model matched with the intelligent application processing request is re-executed, and each intelligent application model is used again to create a corresponding intelligent application instance. In the process of traversing the model database, only one intelligent application instance may be created in each traversal, or multiple intelligent application instances may be created in one traversal. When processing concurrent tasks, multiple intelligent application instances may be created according to one intelligent application model through one traversal, or through multiple traversals with only one corresponding intelligent application instance created according to one intelligent application model in each traversal. In some embodiments, according to the intelligent application model, a network topology architecture of the model, a weight obtained by training, data information, and the like may also be acquired. Each model has at least one instance corresponding to the model, and the total number of models satisfies the following conditions: the total number of models is not greater than the total number of instances, and each model may provide services and functions externally. Each task has an instance corresponding to the task, and the number of active tasks meets the following condition: the total number of active tasks is not greater than the total number of active model instances.

Figure 3:
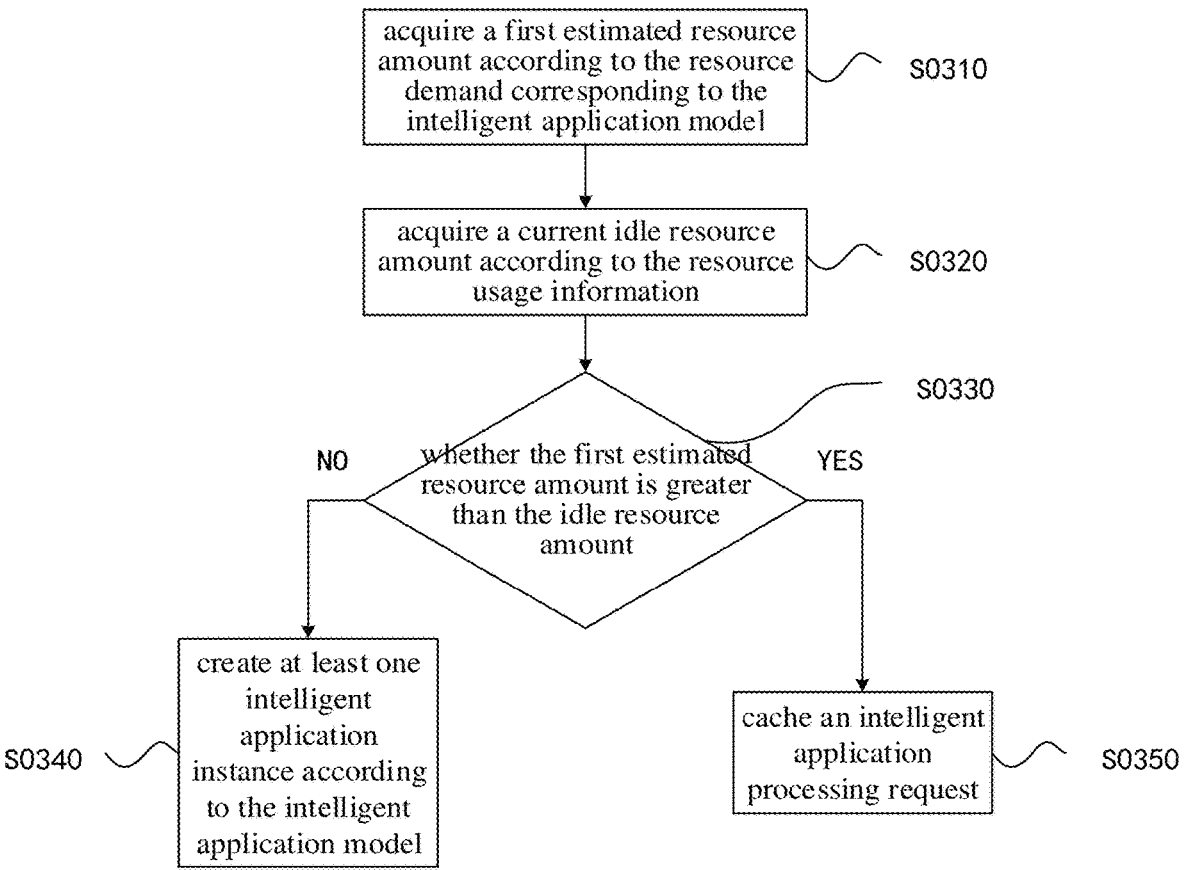
FIG. 3 is a flowchart of an embodiment of S0220 in FIG. 2.

In some embodiments, referring to FIGS. 2 and 3, S0220 includes following steps of S0310 to S0350.

At S0310, a first estimated resource amount is acquired according to the resource demand corresponding to the intelligent application model.

At S0320, a current idle resource amount is acquired according to the resource usage information.

At S0330, the first estimated resource amount is compared with the idle resource amount, if the first estimated resource amount is not greater than the idle resource amount, S0340 is executed; and if the first estimated resource amount is greater than the idle resource amount, S0350 is executed.

At S0340, at least one intelligent application instance is created according to the intelligent application model.

At S0350, the intelligent application processing request is cached.

To create one intelligent application instance, one intelligent application model is acquired, and then one corresponding intelligent application model is matched for the intelligent application processing request, and a resource demand of the intelligent application model and current resource usage information are acquired. If there are idle resources currently and an idle resource amount is not less than a first estimated resource amount of the intelligent application model, one intelligent application instance is created by means of the intelligent application model, and the intelligent application instance is used to create one task. If there is no idle resource currently, the intelligent application processing request is cached in a queue, to wait for scheduling of the queue. The number of queues is not less than the number of intelligent application models stored in a model unit, and the scheduling of queues may be performed by means of a Round Robin scheduling algorithm or according to a first-in-first-out rule.

Figure 4:
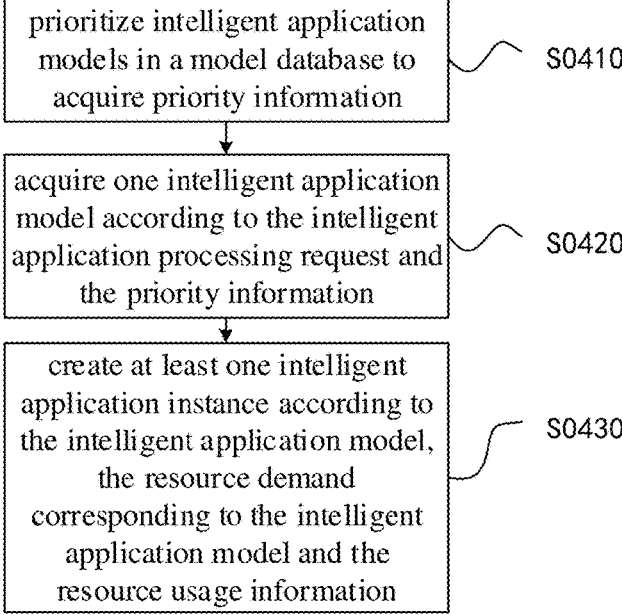
FIG. 4 is a flowchart of another embodiment prior to S0130 in FIG. 1.

In some embodiments, referring to FIGS. 1 and 4, prior to S0130, the method further including following steps S0410 to S0430.

At S0410, priority ranking is performed on intelligent application models in the model database to acquire priority information.

At S0420, one intelligent application model is acquired according to the intelligent application processing request and the priority information.

At S0430, at least one intelligent application instance is created according to the intelligent application model, a resource demand corresponding to the intelligent application model, and the resource usage information.

The intelligent application models in the model database are prioritized, and an intelligent application model with high priority is used first. The model with high priority has an advantage in initial resource allocation, and an initialization priority may be configured by default or artificially. Priorities may be set according to usage frequencies of various intelligent application models, and an intelligent application model with high usage frequency may be set to have high priority. If multiple intelligent application models have identical priority, one intelligent application model is randomly selected for invoking. One intelligent application processing request is acquired, one corresponding intelligent application model is matched for the intelligent application processing request according to the priority information of the intelligent application model, and a resource demand of the intelligent application model and the current resource usage information are acquired. If there are idle resources currently and an idle resource amount is not less than a first estimated resource amount of the intelligent application model, one intelligent application instance is created by means of the intelligent application model, and the intelligent application instance is used to create one task.

In some embodiments, referring to FIGS. 4 and 5, S0430 includes following steps S0510 to S0570.

At S0510, scheduling information of the intelligent application models is acquired according to the priority information.

At S0520, an intelligent application model to be scheduled is determined according to the scheduling information.

At S0530, a second estimated resource amount is acquired according to a resource demand of the intelligent application model to be scheduled.

At S0540, a current idle resource amount is acquired according to the resource usage information.

At S0550, the second estimated resource amount is compared with the idle resource amount, if the second estimated resource amount is not greater than the idle resource amount, S0560 is executed; and if the second estimated resource amount is greater than the idle resource amount, S0570 is executed.

At S0560, at least one intelligent application instance is created according to the intelligent application model to be scheduled.

At S0570, the intelligent application processing request is cached.

To create one intelligent application instance, one intelligent application model is acquired. A scheduling order of the intelligent application models is acquired according to the priority of the intelligent application models. A corresponding intelligent application model, namely an intelligent application model to be scheduled, is matched for the intelligent application processing request from front to back according to the scheduling order, and a resource demand of the intelligent application model to be scheduled and current resource usage information are acquired. If there are idle resources currently and an idle resource amount is not less than a second estimated resource amount of the intelligent application model, one intelligent application instance is created by means of the intelligent application model to be scheduled, and the intelligent application instance is used to create one task. If there is no idle resource currently, the intelligent application processing request is cached in a queue, to wait for scheduling of the queue. The number of queues is not less than the number of intelligent application models stored in the model unit, and the scheduling of queues may be performed by means of the Round Robin scheduling algorithm or according to the first-in-first-out rule. If there is no idle resource currently, the intelligent application processing request is cached in a queue, to wait for scheduling of the queue. The number of queues is not less than the number of intelligent application models stored in the model unit, and the scheduling of queues may be performed by means of the Round Robin scheduling algorithm or according to the first-in-first-out rule.

In some embodiments, referring to FIG. 1, prior to S0140, the method further includes a following operation that the intelligent application processing request and a current to-be-processed request are merged, cached or ranked according to current to-be-processed request information.

One intelligent application processing request is acquired. If there is no idle resource currently, the intelligent application processing request needs to be cached in a queue in which multiple to-be-processed intelligent application processing requests may be cached. The to-be-processed request information includes the number of to-be-processed intelligent application processing requests cached in the queue, the scheduling order of queues and data information of each to-be-processed intelligent application processing request. If there are multiple identical or identical types of to-be-processed intelligent application processing requests in the queue, the multiple to-be-processed intelligent application processing requests may be merged into one to-be-processed intelligent application processing request.

Figure 6:
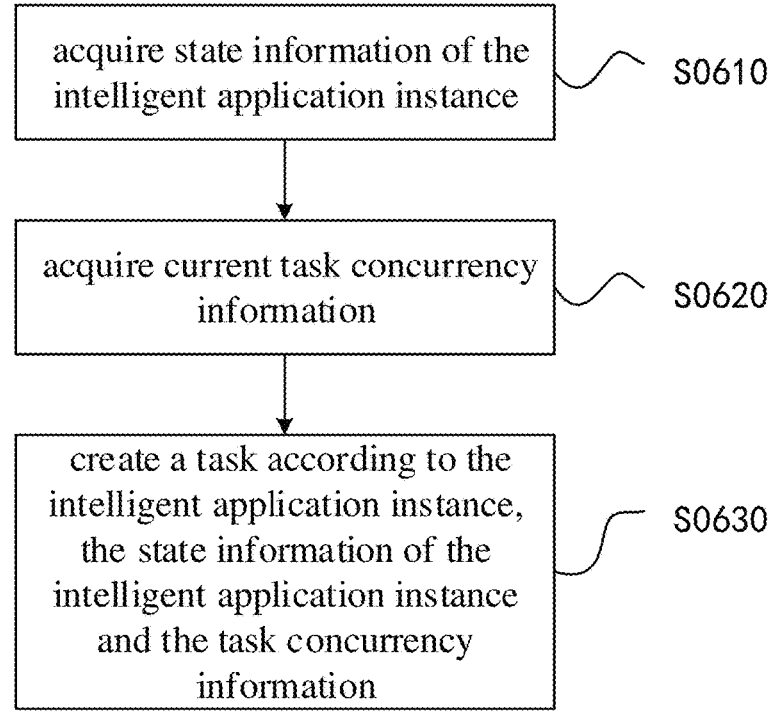
FIG. 6 is a flowchart of an embodiment of S0140 in FIG. 1.

In some embodiments, referring to FIGS. 1 and 6, S0140 includes following steps S0610 to S0630.

At S0610, state information of the intelligent application instance is acquired.

At S0620, current task concurrency information is acquired.

At S0630, a task is created according to the intelligent application instance, the state information of the intelligent application instance and the task concurrency information.

The task concurrency information includes a task concurrency number which refers to the number of tasks processed simultaneously. The state information of the intelligent application instance refers to whether the intelligent application instance is in an idle state or a running state. The current state information of one intelligent application instance depends on the current resource usage information and the resource demand of the intelligent application instance. The current resource usage information is affected by a current task concurrency number, the larger the current task concurrency number is, the more the resources being used are and the less the corresponding idle resources are. One intelligent application processing request is acquired, and if there is no idle resource currently, the intelligent application processing request needs to be cached in a queue in which multiple to-be-processed intelligent application processing requests may be cached. A processing order of the intelligent application processing request is determined according to the scheduling order of queues. The intelligent application processing request corresponds to one intelligent application instance. At the beginning of scheduling the intelligent application processing request in the queue, if the intelligent application instance is in an idle state currently, one task may be created by means of the intelligent application instance, and the task is used to process the intelligent application processing request. If the intelligent application instance is in a running state currently, the intelligent application processing request continues to be cached in the queue.

Figure 7:
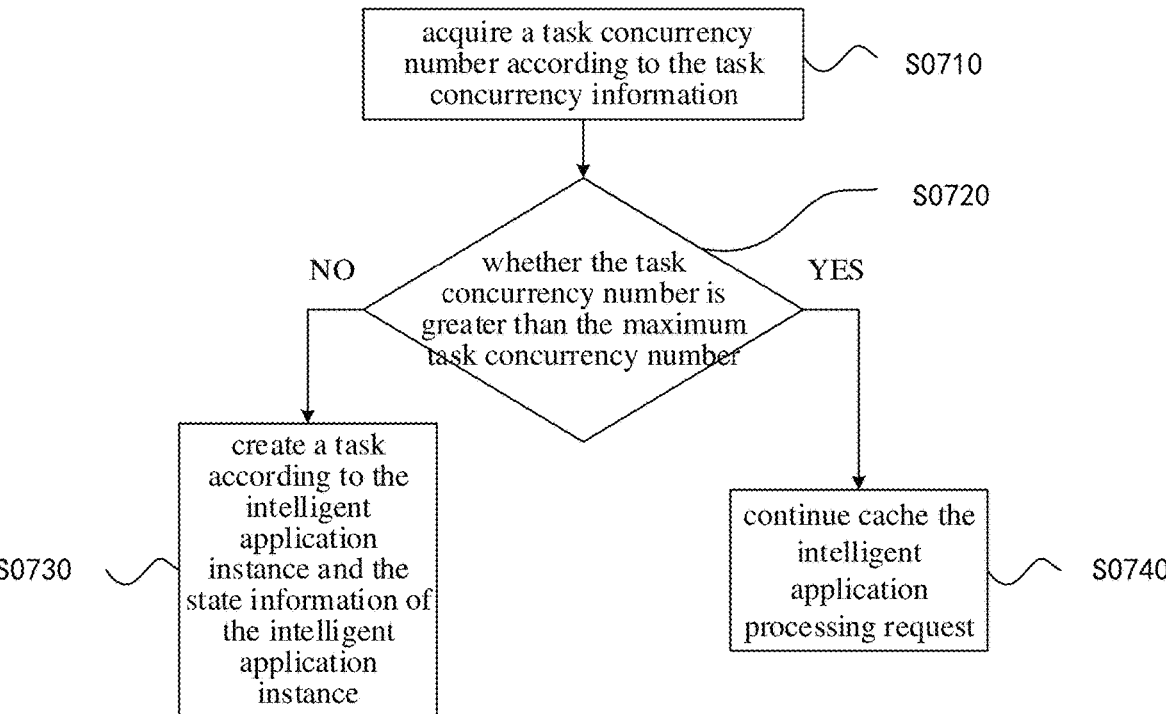
FIG. 7 is a flowchart of an embodiment of S0640 in FIG. 6.

In some embodiments, referring to FIGS. 6 and 7, S0640 includes following steps S0710 to S0740.

At S0710, a task concurrency number is acquired according to the task concurrency information.

At S0720, the task concurrency number is compared with a maximum task concurrency number, if the task concurrency number is not greater than the maximum task concurrency number, S0730 is executed; and if the task concurrency number is greater than the maximum task concurrency number, S0740 is executed.

At S0730, a task is created according to the intelligent application instance and the state information of the intelligent application instance.

At S0740, the intelligent application processing request continues to be cached. The current state information of one intelligent application instance depends on the current resource usage information and the resource demand of the intelligent application instance. The current resource usage information is affected by a current task concurrency number. The larger the current task concurrency number is, the more the resources being used are and the less the corresponding idle resources are. Before the state information of the intelligent application instance is determined, the current resource usage information is confirmed. The maximum task concurrency number may be acquired, which is an upper limit of the task concurrency number, and is limited by the system resource amount. If the current task concurrency number is not greater than the maximum task concurrency number, it is considered that there are idle resources currently; and if the current task concurrency number is greater than the maximum task concurrency number, it is considered that there is no idle resource available for scheduling currently. One intelligent application processing request is acquired, if there is no idle resource currently, the intelligent application processing request needs to be cached in a queue in which multiple to-be-processed intelligent application processing requests may be cached. A processing order of the intelligent application processing request is determined according to the scheduling order of queues. The intelligent application processing request corresponds to one intelligent application instance. If the current task concurrency number is not greater than the maximum task concurrency number, it indicates that there are idle resources currently. At the beginning of scheduling the intelligent application processing request in the queue, if the intelligent application instance is in an idle state, one task may be created by means of the intelligent application instance, and the task is used to process the intelligent application processing request. If the intelligent application instance is in a running state currently, the intelligent application processing request continues to be cached in the queue. By comparing the current task concurrency number with the maximum task concurrency number, the current resource usage information can be known, and then the state information of the intelligent application instance can be acquired according to the current resource usage information and the resource demand of the intelligent application instance.

In some embodiments, referring to FIG. 7, prior to S0720, the method further includes: acquiring a current wait task number, and if the current wait task number is greater than a preset wait task number threshold, adjusting the maximum task concurrency number according to a current maximum task concurrency number, a maximum number of tasks in the system and a preset adjustment factor.

The wait task number refers to the number of tasks cached in the queue. If at a certain time, the number of tasks cached in the queue exceeds an upper limit of a cached number, that is, the current wait task number is greater than the preset wait task number threshold, the current maximum task concurrency number is required to be adjusted. The current maximum task concurrency number is adjusted by means of formula (1):

$$T_{t+1} = \min(T_t(1+a), T_{top}) \tag{1}$$

where $T_t$ represents the maximum task concurrency number at time t, $T_{t+1}$ represents the maximum task concurrency number at time t+1, and $T_{top}$ represents the maximum number of tasks in the system, which is limited by the system resource amount. a represents the adjustment factor, and a is a natural number. The current maximum task concurrency number is adjusted by means of the adjustment factor, and the adjusted maximum task concurrency number is compared with the maximum number of tasks in the system. If the adjusted maximum task concurrency number is greater than the maximum number of tasks in the system, the maximum number of tasks in the system is determined as the maximum task concurrency number at a next time. If the adjusted maximum task concurrency number is less than the maximum number of tasks in the system, the adjusted maximum task concurrency number is determined as the maximum task concurrency number at the next time. If the adjusted maximum task concurrency number is equal to the maximum number of tasks in the system, the adjusted maximum task concurrency number or the maximum number of tasks in the system is determined as the maximum task concurrency number at the next time.

Figure 8:
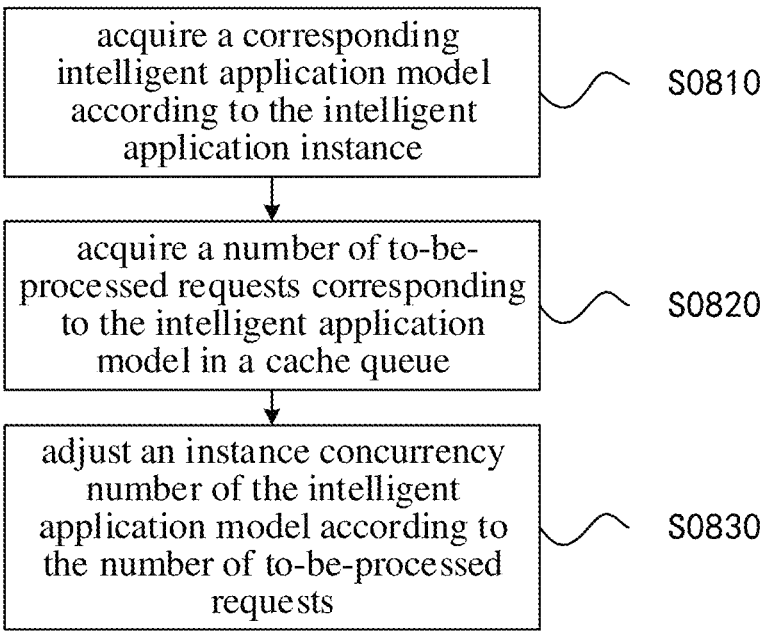
FIG. 8 is a flowchart of an embodiment prior to S0140 in FIG. 1.

In some embodiments, referring to FIGS. 1 and 8, prior to S0140, the method further includes following steps S0810 to S0830.

At S0810, a corresponding intelligent application model is acquired according to the intelligent application instance.

At S0820, a number of to-be-processed requests corresponding to the intelligent application model in a cache queue is acquired.

At S0830, an instance concurrency number of the intelligent application model is adjusted according to the number of to-be-processed requests.

One intelligent application model may be used to create at least one intelligent application instance, one intelligent application instance may be used to create at least one task, and one task may be used to process one intelligent application processing request. Therefore, one intelligent application instance has one corresponding intelligent application model, and one intelligent application processing request has one corresponding intelligent application instance, that is, one intelligent application model may be used to process at least one intelligent application processing request. All the to-be-processed requests corresponding to one intelligent application model may be extracted from the to-be-processed request information, so as to know the number of to-be-processed requests corresponding to the intelligent application model. The instance concurrency number is the number of instances running at the same time, and the setting of the instance concurrency number is limited by the system resource amount. The current resource usage information is affected by the instance concurrency number, the larger the current instance concurrency number, the more the resources occupied by running instances, and the less the idle resources available for scheduling. If at a certain time, the number of to-be-processed requests corresponding to a certain intelligent application model reaches the upper limit of the cached number, the instance concurrency number corresponding to the current intelligent application model is required to be increased. If in a certain period of time, an intelligent application instance corresponding to a certain intelligent application model has always been in an idle state, that is, a to-be-processed request corresponding to the intelligent application model has not been processed, the instance concurrency number corresponding to the current intelligent application model needs to be reduced.

In some embodiments, referring to FIGS. 1 and 9, prior to S0140, the method further includes following steps S0910 to S0960.

At S0910, at least two corresponding intelligent application models are acquired according to the current concurrent intelligent application instances.

At S0920, a number of to-be-processed requests corresponding to each intelligent application model in the cache queue is acquired.

At S0930, priority information of each intelligent application model is acquired.

At S0940, weight information corresponding to each intelligent application model is acquired according to the number of the to-be-processed requests corresponding to the intelligent application model.

At S0950, a priority of the intelligent application model is adjusted according to the priority information and the weight information.

At S0960, an instance concurrency number corresponding to the intelligent application model is adjusted according to the priority of the intelligent application model and the number of the to-be-processed requests.

If at a certain time, the number of the to-be-processed requests in the cache queue reaches the upper limit of the cached number, the current instance concurrency number needs to be increased. If the current concurrent intelligent application instances involve several different intelligent application models, the priority of each intelligent application model is determined and the instance concurrency number corresponding to each intelligent application model is adjusted according to the priority order. Each intelligent application model has an initial priority, which does not take into account the to-be-processed requests in the cache queue. The initial priority is determined by prioritizing all intelligent application models in the model database, and an intelligent application model with high priority is used first. Initial priorities may be set according to usage frequencies of various intelligent application models, and an intelligent application model with high usage frequency may be set to have high priority. If multiple intelligent application models have identical priority, one intelligent application model is randomly selected for invoking. The initial priority information of each intelligent application model may be acquired. The to-be-processed requests corresponding to each intelligent application model may be extracted from the to-be-processed request information, such that the number of the to-be-processed requests corresponding to each intelligent application model and the number of all the to-be-processed requests can be obtained, and then the weight information of the number of the to-be-processed requests corresponding to one intelligent application model accounting for the number of all the to-be-processed requests can be acquired. The weight information may be set according to the importance or urgency of the to-be-processed requests corresponding to the intelligent application model or the size of a data volume. The priority of the intelligent application model is adjusted according to the initial priority information of one intelligent application model and the weight information corresponding to the intelligent application model, and then the priority of each intelligent application model can be acquired. The instance concurrency number corresponding to each intelligent application model is adjusted according to the priority order. The priority of the intelligent application model is adjusted by means of formula (2):

$$P_i' = (1 + b\frac{\text{Cache}_i}{\sum \text{Cache}_j})P_i \qquad (2)$$

where $P_i$ represents an original priority of a model i, and $P_i'$ represents an updated priority of the model i. b represents a weight factor when updating the priority, which is the weight of the number of the to-be-processed requests corresponding to the model i accounting for the number of all the to-be-processed requests, and b is a natural number. $\text{Cache}_i$ represents the number of to-be-processed requests of model i in a period of time, and $\text{Cache}_j$ represents the number of to-be-processed requests of all models in this period of time.

In the embodiments of the present disclosure, through a hierarchical control of the models, instances and tasks, system resources can be adaptively scheduled, and idle resources of the system can be utilized to invoke intelligent application models, such that the resource utilization rate is improved, and thus the intelligent application processing requests can be processed quickly and effectively, the processing efficiency of intelligent applications is improved, the flexibility of intelligent application model deployment and the overall operating efficiency of the device are improved without affecting the operation of existing functional modules of the device. The computing resources and computing tasks can be dynamically adjusted to strike a balance therebetween. When performing model inference and training, since data is only processed in a device without data exchange with other devices, user data can be protected and task processing delay is reduced.

Figure 10:
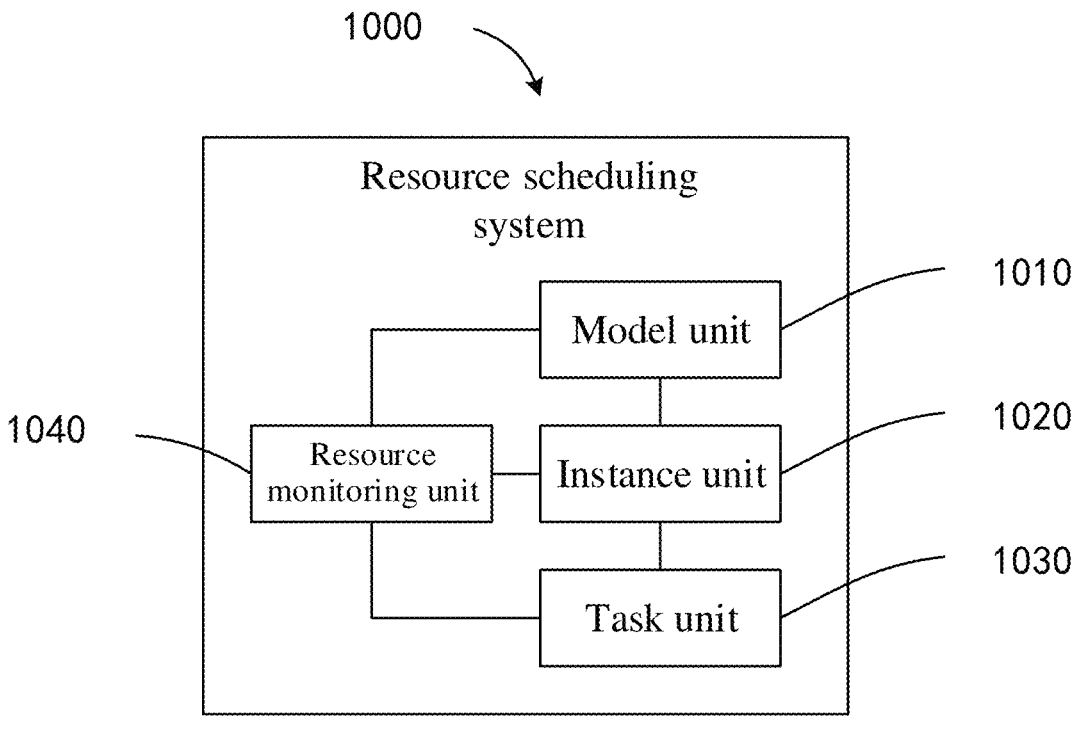
FIG. 10 is a system block diagram of a resource scheduling system provided by an embodiment of the present disclosure.
Figure 11:
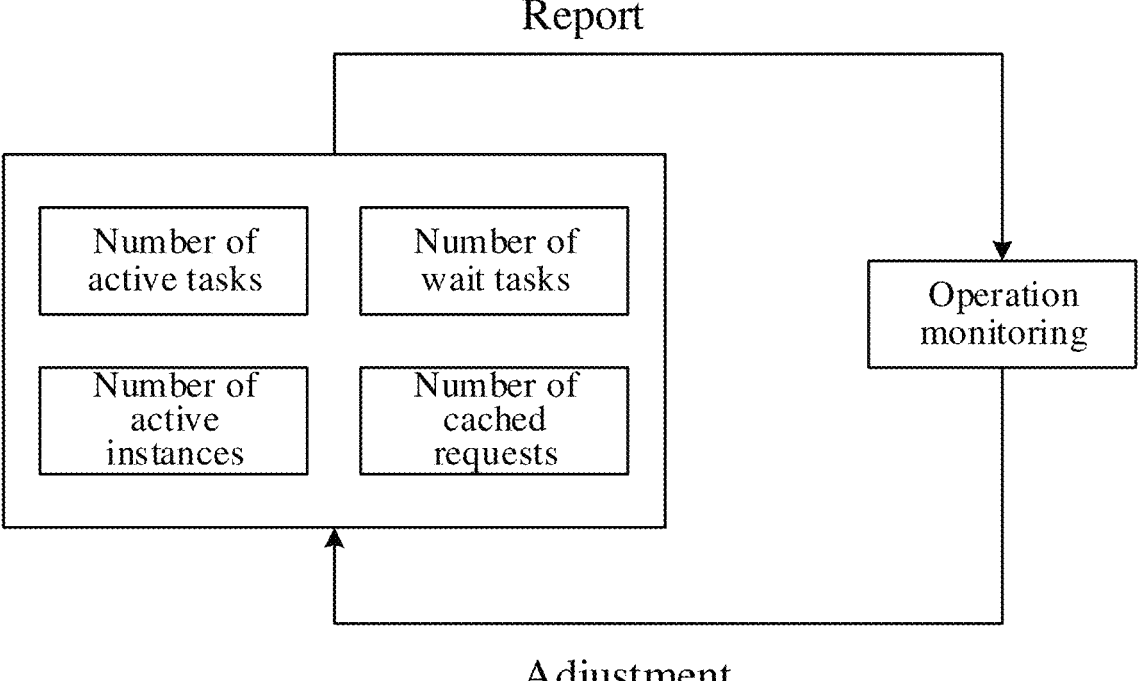
FIG. 11 is a functional schematic diagram of a resource monitoring unit in FIG. 10.

In some embodiments, referring to FIGS. 10 and 11, a resource scheduling system 1000 is shown, which can perform the resource scheduling method in the above embodiments. The resource scheduling system 1000 include a model unit 1010, an instance unit 1020, a task unit 1030 and a resource monitoring unit 1040. The model unit 1010 is configured to store at least one intelligent application model and record a first resource demand and a first concurrency demand of each intelligent application model. The instance unit 1020 is connected to the model unit 1010 and configured to store at least one intelligent application instance and record a second resource demand and a second concurrency demand of each intelligent application instance. The task unit 1030 is connected to the instance unit 1020 and configured to acquire at least one intelligent application processing request and process the intelligent application processing request. The resource monitoring unit 1040 is connected to the model unit 1010, the instance unit 1020 and the task unit 1030 respectively, and is configured to monitor a resource usage of the resource scheduling system 1000 in real time and acquire resource usage information.

In the model unit, a first resource demand of one intelligent application model is a resource amount required to run the intelligent application model, that is, an estimated resource amount of the intelligent application model. If the estimated resource amount is unknown, the resource amount actually occupied by the intelligent application model is recorded when the intelligent application model is run, and take the resource amount as the estimated resource amount, which may be an actual resource amount recorded when the intelligent application model is run once, or may be an average resource amount, a lowest resource or a highest resource amount calculated according to the actual resource amount recorded each time when the intelligent application model is run many times. The first concurrency demand of one intelligent application model is the number of models expecting to run the intelligent application model at the same time, and the number of models is preset to 1 and may be adjusted according to actual task requests.

In the instance unit, a second resource demand of one intelligent application instance is the resource amount required to run the intelligent application instance, that is, an estimated resource amount of the intelligent application instance. If the estimated resource amount is unknown, the resource amount actually occupied by the intelligent application instance is recorded when the intelligent application instance is run, and take the resource amount as the estimated resource amount which may be an actual resource amount recorded when the intelligent application instance is run once, or may be an average resource amount, a lowest resource amount or a highest resource amount calculated according to the actual resource amount recorded each time when the intelligent application instance is run many times. The second concurrency demand of one intelligent application instance is the number of instances expecting to run the intelligent application instance at the same time, and the number of instances is preset to 1 and may be adjusted according to actual task requests.

In the task unit, one task is configured to process only one intelligent application processing request. If there are not enough resources to process all the intelligent application processing requests, unprocessed intelligent application processing requests are cached in queues. The number of the queues is not less than the number of intelligent application models stored in the model unit. The scheduling of the queues may be performed by means of a Round Robin scheduling algorithm or according to a first-in-first-out rule. To create one task, one instance which can process the task is found. If an estimated resource amount of the instance is not greater than a current idle resource amount, one task is created according to the instance. If the estimated resource amount of the instance is greater than the current idle resource amount, a corresponding intelligent application processing request is cached in a queue, to wait for scheduling of the queue.

The resource monitoring unit monitors the resource usage of the resource scheduling system in real time, and synchronizes the resource usage information to the model unit, the instance unit and the task unit in real time, to further adjust the relationship between resources and operation. The resource usage information includes information about resources that the system is using and current idle resource information. For any request, the resource monitoring unit searches whether a model corresponding to the request has instances in an active state and idle state, if yes, a task is created by means of the request and the instances and resources are allocated for running; otherwise, a decision is made as to whether to cache the request and wait, or directly feeds back a failure according to a strategy. In the operating process of the system, the resource monitoring unit dynamically track the running of tasks and the activity status of the instances, and adjust an upper limit of the number of instances and the number of tasks when necessary, that is, establish a closed loop between occupation and distribution of system resources, so as to achieve the purpose of reasonable utilization of resources by dynamically adjusting the model concurrency number and the task concurrency number. In some embodiments, as shown in FIG. 11, the system reports the number of active tasks, wait tasks, active instances or cached requests, and the resource monitoring unit monitors the running and outputs an adjusted number of active tasks, wait tasks, active instances or cached requests.

In some embodiments, the model unit is further configured to set priorities of intelligent application models, and an intelligent application model with high priority is used first. The model with high priority has an advantage in initial resource allocation, and an initialization priority may be configured by default or artificially. Priorities may be set according to usage frequencies of various intelligent application models, and an intelligent application model with high usage frequency is set to have high priority. If multiple intelligent application models have identical priority, one intelligent application model is randomly selected for invoking. In other embodiments, the model unit is further configured to store a network topology architecture of each intelligent application model, weight and data information.

In some embodiments, the instance unit is further configured to create an intelligent application instance according to the intelligent application model, a resource demand corresponding to the intelligent application model, and current resource usage information. One intelligent application model may be configured to create at least one intelligent application instance, one intelligent application instance may be configured to create at least one task, and one task may be configured to process only one intelligent application processing request. At a certain time, one intelligent application instance can only process only one task, so that the task concurrency number should not be greater than an instance concurrency number. The task concurrency number refers to the number of tasks processed simultaneously, and the instance concurrency number refers to the number of instances running simultaneously.

When the system is powered on, according to current resource situation, the number of models, an estimated resource amount of the models and an expected concurrency number of the models, a corresponding active model instance number is determined, and a corresponding number of running instances are created for all models. In the operating process of the system, for a specific training or inference request of a certain model, according to an idle and active state of corresponding instances, it is determined whether to create a task for execution or cache data. For a created task, according to a current task concurrency situation of the system, it is determined whether to process the task immediately or wait. When the task is processed, statistics and evaluation are performed on the active state and running state of the instances, the time-sharing running state of the tasks, and a data caching state, to determine whether to dynamically load the instances or release the resources of the instances. In some embodiments, a model instance is created when the system is powered on and started, and models in the model database are ranked according ing to priorities in a descending order. Initial priorities of the models may be configured by default or artificially. When it is prepared to start traversing of all models for the first time, let i=0, and a first running instance is prepared to be created for a model i. It is judged whether the resources requested by the model i are less than idle resources of the system, if yes, an instance is created for the model i; otherwise, the power-on process is terminated. An instance is created for the model i, and if the model i knows its own resource demand, it is judged whether all models in the database have been traversed, otherwise, a minimum resource amount required by the model to start the instance is recorded, to facilitate the evaluation and calculation during subsequent startup of the system. It is judged whether all models in the database have been traversed, if yes, it is prepared to traverse the model database for a second time; otherwise, a next model is executed to continue the traversing. The model database is traversed for the second time, and a first model is re-executed. For the model i, if it has a demand for concurrent task processing, it is considered that there is a need to create additional active instances (that is, for model i, a total number of instances is greater than or equal to 2). If there is a need to create additional active instances, it is judged whether the resources requested by the model i are less than the idle resources of the system, if yes, a new instance is created for the model i; otherwise, it is judged whether all the models have been traversed. If no additional active instances need to be created, it is judged whether all the models have been traversed, if yes, the whole process is terminated; otherwise, a next model is executed to continue the traversing. The system ensures that system resources and models are initially balanced during power-on. If all models are powered on successfully, it means that all models can provide basic services to the outside world, there is at least one active instance, and the existing system will not be affected. Otherwise, an instance is successfully created first for a model with high priority, and only service functions of part of the models are externally provided.

In the embodiments of the present disclosure, each model has at least one instance corresponding to the model, and the total number of models satisfies the following conditions: the total number of models is not greater than the total number of instances, and each model may externally provide services and functions. Each task has an instance corresponding to the task, and the number of active tasks meets the following conditions: the total number of active tasks is not greater than the total number of active model instances. The resource scheduling system ensures, through a hierarchical control of the models, instances and tasks, that the required inference and training functions are provided, and at the same time, the resource utilization efficiency is maximized. An intelligent inference and training system required can be built by means of existing idle computing resources without affecting original functions. Models can be flexibly deployed and scheduled to make full use of resources without waste, and computing resources and computing tasks can be dynamically adjusted to strike a balance therebetween. When performing model inference and training, since data is only processed in a device without data exchange with other devices, user data can be protected and task processing delay is reduced.

In accordance with another aspect of the present disclosure, an embodiment provides an electronic device. The electronic device includes a memory, a processor, and a program stored in the memory and executable by the processor which, when executed by the processor, causes the processor to carry out the resource scheduling method provided in some embodiments of the present application.

In some embodiments, the electronic device may be a mobile terminal device or a non-mobile terminal device. The mobile terminal device may be a mobile phone, a tablet computer, a laptop computer, a palmtop computer, a vehicle-mounted terminal device, a wearable device, a super mobile personal computer, a netbook, a personal digital assistant, or the like. The non-mobile terminal device may be a personal computer, a television, a teller machine or self-service machine, or the like, which will not be specifically limited in the embodiments of the present disclosure.

In accordance with another aspect of the present disclosure, an embodiment further provides a storage medium configured for computer readable storage, where the storage medium stores at least one program which, when executed by at least one processor, causes the at least one processor to carry out the resource scheduling method provided in some embodiments of the present disclosure.

An embodiment of the present disclosure includes: acquiring an intelligent application processing request; acquiring current resource usage information; matching an intelligent application instance according to the intelligent application processing request; and creating a task according to the resource usage information and the intelligent application instance, to process the intelligent application processing request. According to the embodiments of the present disclosure, system resources can be adaptively scheduled, and system idle resources can be adopted to invoke intelligent application models, such that the resource utilization rate is improved, and thus the flexibility of intelligent application model deployment and the overall operating efficiency of the device are effectively improved without affecting the operation of existing functional modules of the device.

As will be understood by those having ordinary skills in the art that all or some of the steps, systems and functional modules/units in the devices disclosed above may be implemented as software, firmware, hardware and appropriate combinations thereof.

In the hardware implementation, the division between functional modules/units mentioned in the above description does not necessarily correspond to the division of physical components. For example, a physical component may have multiple functions, or a function or step may be cooperatively performed by multiple physical components. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term "computer storage medium" includes volatile and nonvolatile, removable and non-removable media implemented in any method or technology for storing information such as computer readable instructions, data structures, program modules or other data. A computer storage medium may include a RAM, a ROM, an EEPROM, a flash memory or other memory technologies, a CD-ROM, a digital versatile disk (DVD) or other optical disk storages, a magnetic cassette, a magnetic tape, a magnetic disk storage or other magnetic storage devices, or any other media that can be used to store desired information and can be accessed by a computer. In addition, it is well known to those having ordinary skills in the art that the communication medium may generally include computer readable instructions, data structures, program modules or other data in a modulated data signal such as a carrier wave or other transmission mechanism, and may include any information delivery medium.

The above is a detailed description of some embodiments of the present disclosure, but the present disclosure is not limited to the above embodiments. Those having ordinary skills in the art may also make various equivalent modifications or substitutions without violating the scope of the present disclosure, and these equivalent modifications or substitutions are included in the scope defined by the claims of the present disclosure.

The invention claimed is:

1. A resource scheduling method, comprising:
acquiring an intelligent application processing request;
acquiring current resource usage information;
matching an intelligent application instance according to the intelligent application processing request; and
creating a task according to the resource usage information and the intelligent application instance, to process the intelligent application processing request;

wherein prior to creating a task according to the resource usage information and the intelligent application instance, the method further comprises:

acquiring at least two corresponding intelligent application models according to the current concurrent intelligent application instances;

acquiring a number of to-be-processed requests corresponding to each respective intelligent application model in the cache queue;

acquiring priority information of the intelligent application model;

acquiring, according to the number of the to-be-processed requests corresponding to each respective intelligent application models, weight information corresponding to the respective intelligent application model;

adjusting a priority of the respective intelligent application model according to the priority information and the weight information; and adjusting an instance concurrency number corresponding to the respective intelligent application model according to the priority of the respective intelligent application model and the number of the to-be-processed requests.

2. The resource scheduling method of claim 1, wherein prior to matching an intelligent application instance according to the intelligent application processing request, the method further comprises:

acquiring at least one intelligent application model according to the intelligent application processing request; and creating at least one intelligent application instance according to the intelligent application model, a resource demand corresponding to the intelligent application model, and the resource usage information.

3. The resource scheduling method of claim 2, wherein creating at least one intelligent application instance according to the intelligent application model, a resource demand corresponding to the intelligent application model, and the resource usage information comprises:

acquiring a first estimated resource amount according to the resource demand corresponding to the intelligent application model;

acquiring a current idle resource amount according to resource usage information;

comparing the first estimated resource amount with the idle resource amount; and creating at least one intelligent application instance according to the intelligent application model in response to the first estimated resource amount being not greater than the idle resource amount.

4. The resource scheduling method of claim 3, wherein creating a task according to the resource usage information and the intelligent application instance comprises:

acquiring state information of the intelligent application instance;

acquiring current task concurrency information;

creating a task according to the intelligent application instance, the state information of the intelligent application instance and the task concurrency information.

5. The resource scheduling method of claim 3, wherein prior to creating a task according to the resource usage information and the intelligent application instance, the method further comprises:

acquiring a corresponding intelligent application model according to the intelligent application instance;

acquiring a number of to-be-processed requests corresponding to the intelligent application model in a cache queue; and adjusting an instance concurrency number of the intelligent application model according to the number of to-be-processed requests.

6. The resource scheduling method of claim 2, wherein creating a task according to the resource usage information and the intelligent application instance comprises:

acquiring state information of the intelligent application instance;

acquiring current task concurrency information;

creating a task according to the intelligent application instance, the state information of the intelligent application instance and the task concurrency information.

7. The resource scheduling method of claim 2, wherein prior to creating a task according to the resource usage information and the intelligent application instance, the method further comprises:

acquiring a corresponding intelligent application model according to the intelligent application instance;

acquiring a number of to-be-processed requests corresponding to the intelligent application model in a cache queue; and adjusting an instance concurrency number of the intelligent application model according to the number of to-be-processed requests.

8. The resource scheduling method of claim 1, wherein prior to matching an intelligent application instance according to the intelligent application processing request, the method further comprises:

prioritizing intelligent application models in a model database to acquire priority information;

acquiring one of the intelligent application models according to the intelligent application processing request and the priority information;

creating at least one intelligent application instance according to the intelligent application model, a resource demand corresponding to the intelligent application model, and the resource usage information.

9. The resource scheduling method of claim 8, wherein creating a task according to the resource usage information and the intelligent application instance comprises:

acquiring state information of the intelligent application instance;

acquiring current task concurrency information;

creating a task according to the intelligent application instance, the state information of the intelligent application instance and the task concurrency information.

10. The resource scheduling method of claim 1, wherein creating a task according to the resource usage information and the intelligent application instance comprises:

acquiring state information of the intelligent application instance;

acquiring current task concurrency information;

creating a task according to the intelligent application instance, the state information of the intelligent application instance and the task concurrency information.

11. The resource scheduling method of claim 10, wherein creating a task according to the intelligent application instance, the state information of the intelligent application instance and the task concurrency information comprises:

acquiring a task concurrency number according to the task concurrency information;

comparing the task concurrency number with a maximum task concurrency number;

creating a task according to the intelligent application instance and the state information of the intelligent application instance in response to the task concurrency number being not greater than the maximum task concurrency number.

12. The resource scheduling method of claim 11, wherein prior to comparing the task concurrency number with the maximum task concurrency number, the method further comprises:

acquiring a current wait task number; and adjusting the maximum task concurrency number according to a current maximum task concurrency number, a maximum number of tasks in the system and a preset adjustment factor in response to the current wait task number being greater than a preset wait task number threshold.

13. The resource scheduling method of claim 1, wherein prior to creating a task according to the resource usage information and the intelligent application instance, the method further comprises:

acquiring a corresponding intelligent application model according to the intelligent application instance;

acquiring a number of to-be-processed requests corresponding to the intelligent application model in a cache queue; and adjusting an instance concurrency number of the intelligent application model according to the number of to-be-processed requests.

14. An electronic device, comprising: a memory, a processor, and a program stored in the memory and executable by the processor which, when executed by the processor, causes the processor to perform a resource scheduling method, the resource scheduling method comprising:

acquiring an intelligent application processing request;

acquiring current resource usage information;

matching an intelligent application instance according to the intelligent application processing request; and creating a task according to the resource usage information and the intelligent application instance, to process the intelligent application processing request;

wherein prior to creating a task according to the resource usage information and the intelligent application instance, the method further comprises:

acquiring at least two corresponding intelligent application models according to the current concurrent intelligent application instances;

acquiring a number of to-be-processed requests corresponding to each respective intelligent application model in the cache queue;

acquiring priority information of the intelligent application model;

acquiring, according to the number of the to-be-processed requests corresponding to each respective intelligent application models, weight information corresponding to the respective intelligent application model;

adjusting a priority of the respective intelligent application model according to the priority information and the weight information; and adjusting an instance concurrency number corresponding to the respective intelligent application model according to the priority of the respective intelligent application model and the number of the to-be-processed requests.

15. A non-transitory computer-readable storage medium configured for computer-readable storage, wherein the storage medium stores at least one program which, when executed by at least one processor, causes the at least one processor to perform a resource scheduling method, the resource scheduling method comprising:

acquiring an intelligent application processing request;

acquiring current resource usage information;

matching an intelligent application instance according to the intelligent application processing request; and creating a task according to the resource usage information and the intelligent application instance, to process the intelligent application processing request;

wherein prior to creating a task according to the resource usage information and the intelligent application instance, the method further comprises:

acquiring at least two corresponding intelligent application models according to the current concurrent intelligent application instances;

acquiring a number of to-be-processed requests corresponding to each respective intelligent application model in the cache queue;

acquiring priority information of the intelligent application model;

acquiring, according to the number of the to-be-processed requests corresponding to each respective intelligent application models, weight information corresponding to the respective intelligent application model;

adjusting a priority of the respective intelligent application model according to the priority information and the weight information; and adjusting an instance concurrency number corresponding to the respective intelligent application model according to the priority of the respective intelligent application model and the number of the to-be-processed requests.

* * * * *